United States Patent [19]

Bassfeld

[11] Patent Number: 5,000,884

[45] Date of Patent: Mar. 19, 1991

[54] AERATION INSTALLATION

[75] Inventor: Hans-Joachim Bassfeld, Wesel, Fed. Rep. of Germany

[73] Assignee: Envicon Luft- und Wassertechnik GmbH & Co. KG, Fed. Rep. of Germany

[21] Appl. No.: 417,837

[22] Filed: Oct. 6, 1989

[30] Foreign Application Priority Data

Oct. 8, 1988 [DE] Fed. Rep. of Germany ....... 3834317
Jun. 9, 1989 [DE] Fed. Rep. of Germany ....... 3918907

[51] Int. Cl.$^5$ .............................................. B01F 3/04
[52] U.S. Cl. ............................................... 261/122
[58] Field of Search ........................................ 261/122

[56] References Cited

U.S. PATENT DOCUMENTS

| 1,319,646 | 10/1919 | Eccleston | 261/122 |
| 1,642,051 | 9/1927 | Wall | 261/122 |
| 1,759,983 | 5/1930 | Houston | 261/122 |
| 1,792,285 | 2/1910 | Curry et al. | 261/122 |
| 1,792,286 | 2/1931 | Curry et al. | 261/122 |
| 3,178,730 | 4/1965 | Bogar | 261/122 |
| 3,490,752 | 1/1970 | Danjes et al. | 261/122 |
| 3,642,260 | 2/1972 | Danjes | 261/122 |
| 4,624,781 | 11/1986 | Messner | 261/122 |
| 4,842,779 | 6/1989 | Jager | 261/122 |
| 4,849,139 | 7/1989 | Jager | 261/122 |

FOREIGN PATENT DOCUMENTS

| 17507 | 7/1913 | Denmark | 261/122 |
| 3410267 | 9/1985 | Fed. Rep. of Germany . | |
| 272781 | 3/1930 | Italy | 261/122 |
| 281136 | 1/1931 | Italy | 261/122 |

Primary Examiner—Tim Miles
Attorney, Agent, or Firm—John F. A. Earley; John F. A. Earley, III

[57] ABSTRACT

The invention refers to an aeration installation for introducing a gas, in which a cover is arranged on a foundation, through which the gas is able to penetrate this covering through individual, delimitable sections.

7 Claims, 2 Drawing Sheets

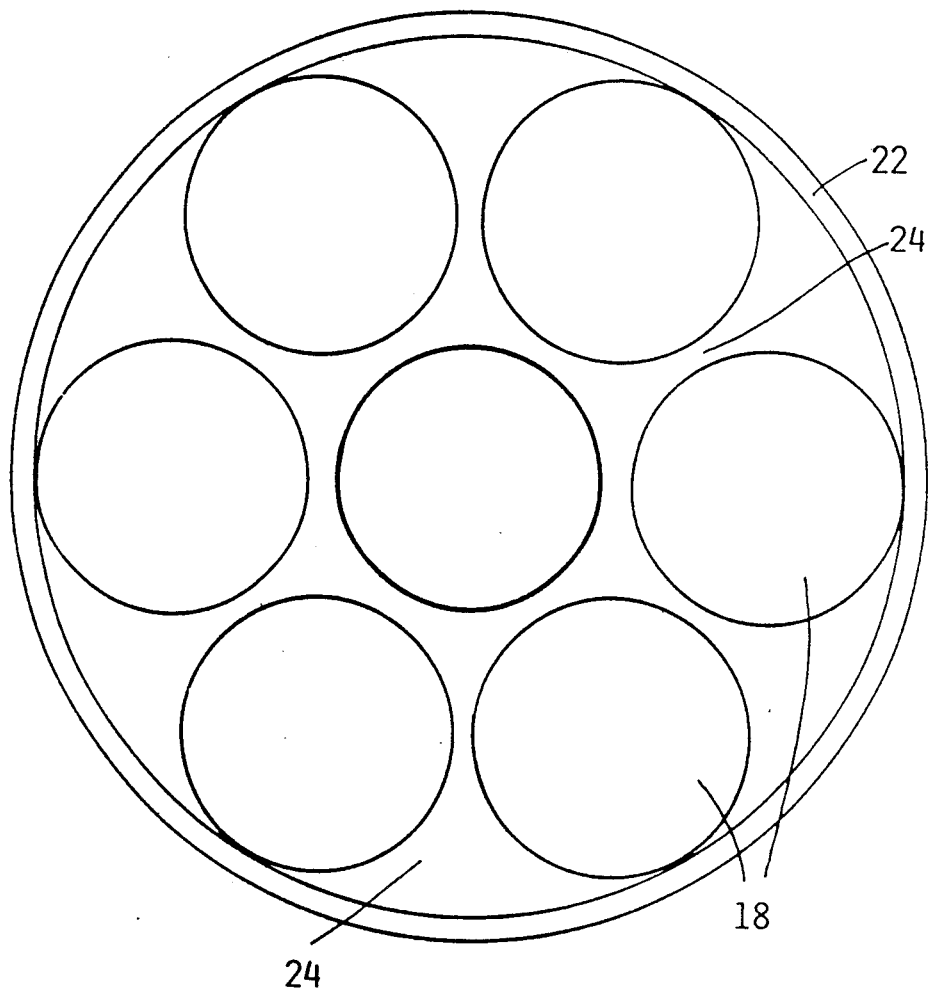

AERATION INSTALLATION

DESCRIPTION

The invention concerns an aeration installation for injecting a gas into a liquid, in particular, into to be treated waste water. These types of aeration units are, among others, for raw content aeration of waste water, for introducing air or oxygen into activating basins or for sludge stabilizion, for aerating rivers, lakes and fish ponds, but also, for example, for neutralizing liquids by gassing with carbon dioxide.

These types of aeration units are known essentially in two modes of rendition, namely pipe and so-called surface or disk aerators. The invention is concerned with the latter group.

In the DE-PS 34 10 267, is described a disk aerator that consists of a foundation with at least one gas opening as well as a gas-permeable membrane cover over the foundation and attached to the foundation, in which a means for limiting the filling out of the membrane in the gassing state is disposed in the area of the gas opening, one end of which is attached to the membrane and operating in conjunction with its other end to a counterpiece located in the area of the opening.

With such a installation, the membrane should be "held down" in the area of gas feed, thereby a more even gassing intensity is strived for.

It is obvious that the known "stroke limiting device" is relatively complexly constructed and, most of all, also takes away a considerable portion of the gassing surface of the membrane, namely in the area in which the highest gassing intensity is normally reached.

The goal of the present invention is to develop a specific aeration installation in such a way that the optimal gassing intensity and evening out over the gassing surface is achieved. In the process, the aeration installation should preferably be of a simple construction, and be formed in such a way that known gassing means can also be supplemented.

To solve the task Presented the invention makes use of the following knowledge: It was confirmed that an optimal gassing intensity and evenness can be achieved particularly in those sections of the gas-permeable membrane in which the membrane shows the greatest angle of curvature. This is particularly true for perforated membranes. In such a membrane, the individual perforation openings open namely only at a certain angle of curvature, while they are practically closed in the undeformed s(ate. Such a mode of rendition of a membrane is preferred in order to guarantee that in the non-gassing state the membrane is more or less dense and the liquid cannot enter into the aeration installation and thus into the gas supply line.

The invention therefore aims to form the gas-permeable part of the aeration installation in such a way that the largest possible surface sections are available as a gassing surface and within these surface sections the largest possible areas are elastically deformable in such a way that large curvature radii can be formed. This results in the further knowledge that the actual gassing surface should preferably be divided into various individual sections.

In its most general mode of rendition, the aeration installation has the following characteristics:
a foundation,
at least a partially deformable cover attached to the foundation, and
at least one gas supply means in the area between foundation and cover, with
the cover divided into sections of different deformability (different deformation ProPerties)
at least the sections of greater deformability (in this case: under gas pressure) having openings for the gas.

While in the current state of the art (DE-PS 34 10 267) the membrane arranged on the foundation is formed over the entire surface with a material of constant characteristics and physical property values, the aeration installation according to the invention is distinguished thereby in that the cover has sections of different material characteristics (physical property values). This is achieved, in particular, through different moduli of elasticity in various sections.

Hereby the following effect is obtained: In the gassing state, the sections with the higher modulus of elasticity, i.e. the less deforamble sections remain more or less stable in shape in comparison to the non-gassing state, while the more elastic sections positioned in between are able to form in a known ways and means.

Hereby the gassing surface that is in one part in the current state of the art is thus divided into numerous partial gassing surfaces which at times, per se, yield optimal gassing qualities.

The construction of the cover according to the invention can be produced in various ways and means.

After an initial mode of rendition, the less deformable sections are formed linearly or staggered between the surface sections with lower modulus of elasticity. In this way, the more or less non-deformable areas only comprise a small part of the . overall gassing surface, and thus only unessential sections of the gassing surafce are lost.

But even, according to the invention, they can in turn be formed with gas openings in such a way that practically the entire cover is then available as a gassing surface.

To obtain particularly favorable gassing conditions, the less deformable sections, especially in the case of disk aerators, should be constructed as rings arranged at intervals from each other.

These rings can either be concentric and spaced at intervals to each other or, however, also be formed as individual rings at intervals to each other.

In the first case, ring disk shaped sections of the membrane are formed between the rings, which deform as a ring-shaped tunnel in the gassing state. In the latter case, the elastic sections each have a circular shape and in the gassing state, lead to the formation of half shells.

In all modes of rendition, the less deformable sections serve as boundaries for the deformed porous intermediate areas.

These unelastic sections can simply consist of a material quality of greater specific weight.

For example, in the case of a cover of a rubber-quality, the unelastic sections can be formed by being reinforced with metal pieces. For example, according to an advantageous mode of rendition of the invention, metal rings or slats can he vulcanized into the corresponding places.

It is even easier if the corresponding sections is of a hard rubber quality fulfilling the same function, for example, while the more elastic sections arranged in between are formed from an easily deformable rubber consistancy with perforations. The modulus of elasticity can also be modified by having the areas that are to be deformed less formed thicker than the other membrane sections.

In the aforementioned mode of rendition examples the cover can be designated as one part. But it is also possible to form the covering as several parts, with the less elastic sections formed by a part with surface breaks, attached to the edge of the foundation, and the more elastic sections are formed by a membrane with perforations or the like, arranged between foundation and the part, which is fixed on the edge of the part and/or the foundation.

In this way, the less elastic part can consist of a metal or plastic plate or a metal or plastic basket, for example. The membrane connected to the foundation is then preferably formed in such a way that, in the non-gassing state, it lies opposite the metal or plastic part. But if gas is introduced through the gas supply means, the membrane can then form upwards into the area of the breaks of the plate or the basket (i.e, away from the foundation) and similar configurations then come about as in the models described at the beginning with slats integrated in the membrane If the plate has several round breaks, the membrane will thus form through the breaks in the formation of a hemispherical shape.

It is always guaranteed that a number of surface sections with high radius of curvature are formed, which is favorable for the gassing intensity due to the effects described at the beginning.

The membrane can of course also be arranged between two metal or plastic parts of the aforementioned type. The effect obtained is the same.

To obtain the most even distribution of gas, a gas distibuting space is preferably formed between the foundation and the cover. In the simplest case, this can take place with either the foundation being formed like a disk (then the cover can easily be constructed as a simple plate) or the foundation is more or less flat and the covering is then formed like a basket, with the covering then having its opening edge facing downwards towards the foundation and attached to it.

The gas supply means is preferably arranged in the middle to obtain an even gas distribution on all sides. Naturally, several gas supply means can also be arranged spread out over the gassing surface.

The advantages to be had with the aeration installation according to the invention are obvious By subdividing the gassing surfaces a number of individual aeration sections are formed, each displaying optimal aeration characteristics, particularly with a section with a large radius of curvature.

Practically the entire gassing surface is available for gassing and unused surfaces are largely eliminated.

Known aeration installations can be supplemented at any time by simply changing the covering (membrane).

Every type of limiting device, etc. is eliminated

Further characteristics of the invention result from the characteristics of the sub-claims as well as the other registration documents.

Below, the invention is described in greater detail in an example rendition, with extremely simplified cross-section (lengthwise) illustrations. Identical components or those with identical functions are identified with the same reference numbers in the figures.

BRIEF DESCRIPTION OF THE DRAWINGS

FIG. 1c is a top plan view of the aeration installation of FIGS. 1a and 1b.

Figure 1A:
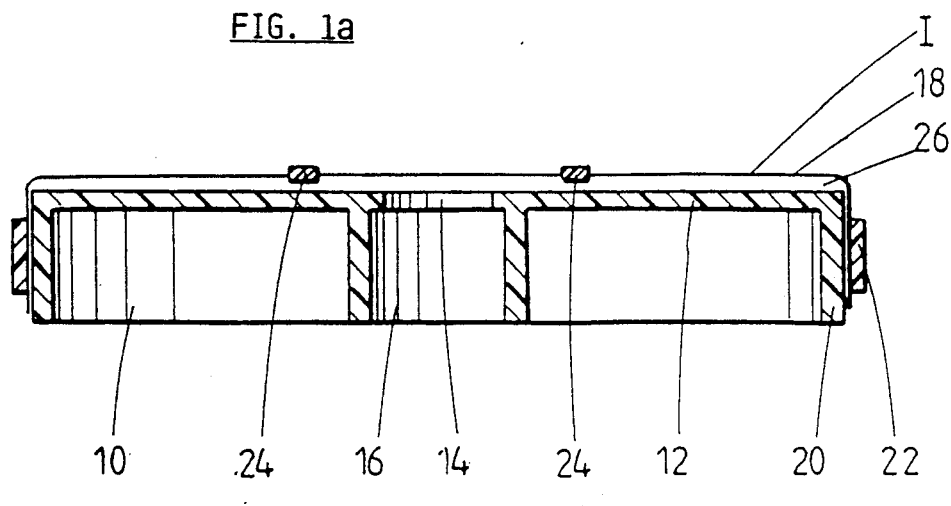
FIG. 1a is a view in elevation showing an aeration installation in a non-inflated addition.

The aeration installation according to FIG. 1a consists of a dish-shaped foundation 10, the circular lid 12 of which has an opening 14 in its middle from which a gas supply line 16 runs downwards The foundation 10 and its parts consist of a glass fiber reinforced plastic.

A cover 18 runs above the lid 12 and is shaped, in this example, as a membrane with perforations .

The membrane 18 is pulled around the outer edge 20 and is attached to the foundation 10 there by means of a muzzle hoop 22.

As can be seen from the drawing, a ring-shaped slat 24 runs in the area of the membrane 18, with a greater material strength than the membrane 18. While the membrane 18 consists of a highly elastic rubber material, the ring-shaped slat 24 is formed by a hard rubber incorporated into the membrane 18. Instead of one slat, several slats or another configuration of the connecting elements can be used or selected. It is also possible to form the slat from the same material as the other parts of the covering, i.e. also of rubber, but - as shown thicker than the membrane sections. A higher modulus of elasticity of the slat 24 compared to the membrane 18 results from thickening the material and leaving out the perforation.

In the non-gassing state, as shown in FIG. 1a the membrane 18 has the position marked 1 in relation to the foundation 10. A small aeration space 26 is created between the membrane 18 and the lid 12 of the foundation 10.

If a gas, for example oxygen, is then introduced under pressure into the aeration space 26 through the gas supply line 16 and the opening 14, a deformation of the elastic sections 18', 18" of the membrane 18 is caused, with the ring-shaped section 18' of the membrane 18 forming upwards as a ring-shaped tunnel, while at the same time the circular section 18" of the membrane 18 takes on a hemispheric shape.

Figure 1B:
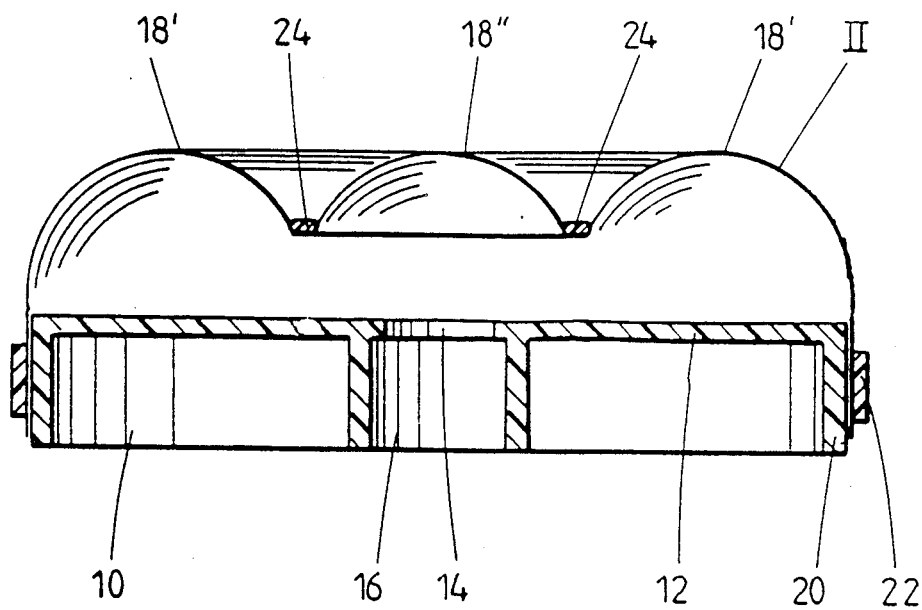
FIG. 1b is a view in elevation showing the aeration installation of FIG. 1a in an inflated condition.

Due to the largely non-elastic characteristics of the slat (hard rubber ring) 24 it hardly gets deformed at all and essentially maintains its original shape even in the gassing condition marked by the figure II of FIG. 1b.

It is to be understood from the form of the membrane 18', 18" according to II that large areas of the membrane have a pronounced radius of curvature which provides for an optimal and even gassing.

The aerator shown in FIGS. 1a, 1b and 1c is used for raw-content aeration of a waste water, for examPle, and arranged on the botton of the waste water container in such a way that a stream of oxygen exiting through the perforation of the membrane 18, 18', 18" can pass upwards into the liquid.

Without the formation of the essentially non-elastic ring-shaped slat 24, there would be a single bell-shaped forming of the membrane 18 and thus only to a slight surface section of greater curvature roughly in the middle above the opening 14.

It is obvious that through the forming of the membrane with elastic and non-elastic or more and less elastic sections according to the invention, a division of the gas stream in the sense of an optimal gas supply into the liquid can be obtained.

I claim:

1. An aerator comprising a base including a gas inlet, a flexible membrane secured on said base so as to form an inlet chamber therebetween, said membrane comprising at least one integrally formed, relatively rigid, imperforate ring-shaped portion surrounded by more easily deformable perforated portions adapted to bulge outwardly during inflation.

2. An aerator comprising a base including a gas inlet, a flexible membrane secured on said base so as to form an inlet chamber therebetween, said membrane comprising at least one integrally formed, relatively rigid, ring-shaped portion surrounded by more easily deformable perforated portions adapted to bulge outwardly during inflation.

3. An aerator according to claim 2 in which the relatively rigid ring-shaped portions are constructed as concentric rings and the easily deformable perforated portions are constructed as concentric rings running at an interval between said relatively rigid portions.

4. An aerator according to claim 2 in which the relatively rigid portions are comprised of hard rubber.

5. An aerator according to claim 2 in which the relatively rigid portions are comprised of the same material as said easily deformable portions and have a reinforcement of a less elastic material.

6. An aerator according to claim 5 in which the relatively rigid portions have a metal or plastic reinforcement.

7. An aerator according to claim 5 in which the relatively rigid portions have a fiber reinforcement.

* * * * *